United States Patent
Brown

[11] Patent Number: 6,131,856
[45] Date of Patent: Oct. 17, 2000

[54] PARACHUTE TRAJECTORY CONTROL

[76] Inventor: Glen J. Brown, 458 Thayer Rd., Santa Cruz, Calif. 95060

[21] Appl. No.: 09/090,668

[22] Filed: Jun. 4, 1998

Related U.S. Application Data

[63] Continuation-in-part of application No. 08/929,448, Sep. 15, 1997, abandoned.

[51] Int. Cl.$^7$ .................................................. B64D 17/14
[52] U.S. Cl. ..................... 244/152; 244/142; 244/138 R; 244/902
[58] Field of Search ..................... 244/152, 142, 244/902, 138 R

[56] References Cited

U.S. PATENT DOCUMENTS

| | | | |
|---|---|---|---|
| 2,483,088 | 9/1949 | De Haven | 254/93 R |
| 2,730,317 | 1/1956 | Onanian | 244/152 |
| 3,823,600 | 7/1974 | Wolff | 73/12 |
| 4,127,246 | 11/1978 | Andres | 244/138 R |
| 4,722,497 | 2/1988 | Stanford et al. | 244/152 |
| 5,021,064 | 6/1991 | Caines | 623/26 |
| 5,080,305 | 1/1992 | Stencel et al. | 244/152 |
| 5,393,016 | 2/1995 | Howard et al. | 244/138 R |
| 5,678,788 | 10/1997 | Hetzer et al. | 244/152 |
| 5,909,859 | 6/1999 | Janicki | 244/153 A |

OTHER PUBLICATIONS

Author: Unknown. (Jul. 1998). Air Muscle. [Online], 1–3. Available Web Site: www.imagesco.com/articles/airmuscle/AirMuscleDescription01.html. Last Update: Jul. 1998. Accessed on: Jul. 13, 1999.

*Primary Examiner*—Peter M. Poon
*Assistant Examiner*—Judith A. Nelson
*Attorney, Agent, or Firm*—Frank C. Price

[57] ABSTRACT

A parachute has its suspension lines divided into groups, each group connected to the load through a linear actuator. During descent of the parachute, foreshortening of an actuator or of any group of adjacent actuators causes the parachute trajectory to move in the direction of the foreshortened actuator. Multiple parachutes connected to a single load, with each parachute being connected to the load through an actuator, can similarly have their trajectory controlled. The trajectory of the parachute can also be changed by a system of normally foreshortened actuators which lengthen by actuation. Simultaneous, rapid shortening of all actuators just before ground impact can be used to reduce the descent velocity at ground impact.

5 Claims, 6 Drawing Sheets

PARACHUTE TRAJECTORY CONTROL

This is a Continuation-in-Part application for Ser. No. 08/929,448 filed Sep. 15, 1997 now abandoned.

SUMMARY OF THE INVENTION

This invention is a control for the trajectory of a descending, non-gliding parachute. Another type of parachute, the gliding parachute, already uses methods for steerable gliding. Such gliding parachutes are used for the delivery of cargo or personnel over a horizontal distance as they glide downward.

Low-glide parachutes, generally defined as having a glide ratio (horizontal velocity/vertical velocity) less than 1.0, are also known to be steered. Non-gliding parachutes can be modified for a low-glide characteristic. However, continuous gliding is not always necessary or desired. This invention can create gliding as needed.

This invention applies to the non-gliding type of parachute. It can be used to control the trajectory of non-gliding parachutes for the purpose of improving landing position accuracy.

This invention provides a control means for causing a descending, non-gliding parachute to move horizontally in a particular direction, thus changing its trajectory. The controls of this invention use known means for electronic guidance and navigation connected to the mechanical means of this invention to modify a given trajectory of a descending parachute towards a desired landing location. The invention can be applied to a single parachute or to a group of parachutes suspending the load.

The invention uses long-stroke linear actuators such as (1) pneumatic cylinders or pneumatic muscle devices actuated by compressed gas through solenoid valves or (2) electromechanical actuators such as screw motors or winches. The pneumatic muscle device is a woven tube surrounding a bladder. The weave of the surrounding tube is such that when the tube is forced by fluid pressure in the bladder to expand, its length becomes foreshortened. This foreshortening upon being pressured or lengthening upon being de-pressured is the linear actuation mode of the device. The pneumatic muscle is operated by control means which can include altitude sensing, a receiver of control signals from a source remote to the parachute system and a control means for the pressure within the bladder of a given pneumatic muscle device.

The suspension lines, attached to the parachute canopy around its perimeter, are divided into groups. The lines of each group are attached to a single linear actuator. The linear actuators, each holding a group of suspension lines, have their lower ends connected together at the payload or onto the riser system which leads to the payload. Horizontal motion develops from the section of the suspension lines where the suspension is foreshortened or lengthened by one or more actuators, thus tilting the skirt of the parachute. The tilting causes horizontal motion in the direction of the lowest edge of the parachute.

In an alternative form of the invention, all actuators are initially foreshortened. Steering is accomplished by the lengthening of one or more actuators on the side opposite the desired direction of motion.

A second alternative form of the invention is for use with multiple parachutes, known as a cluster, connected to a single payload. One linear actuator each is attached to all the suspension lines of each parachute in the cluster. When one or more actuators are shortened or lengthened relative to the others, an asymmetric flow pattern about the entire assembly is established which causes the payload to develop horizontal velocity.

DeHaven has already presented the case of a parachute soft landing using rapid retraction by a single linear actuator connected between the payload and the parachute. The use of multiple actuators in unison in a parachute system to reduce the impact velocity of the payload is part of this invention. However, our invention is more than a logical extension of DeHaven because of the following unexpected result: In our use of the concept of foreshortening of all lines we combine smaller parachutes with a soft landing system in order to provide a system with higher horizontal velocity in the guidance phase of the descent. Smaller parachutes have a faster descent velocity and consequently a higher horizontal velocity under trajectory control. The higher horizontal velocity is important for overcoming wind effects on the parachute trajectory. However, the result can be an excessive impact velocity. The impact velocity of our system for a parachute with high descent velocity is reduced to a feasible, lower impact velocity by providing means for rapid, simultaneous retraction of all of the linear actuators the instant before impact of the load with the ground.

BRIEF DESCRIPTION OF THE DRAWINGS

FIG. 4 illustrates the case of guidance being affected by the lengthening, rather than the shortening of actuators attached within the suspension system of lines.

DETAILED DESCRIPTION

Figure 1:
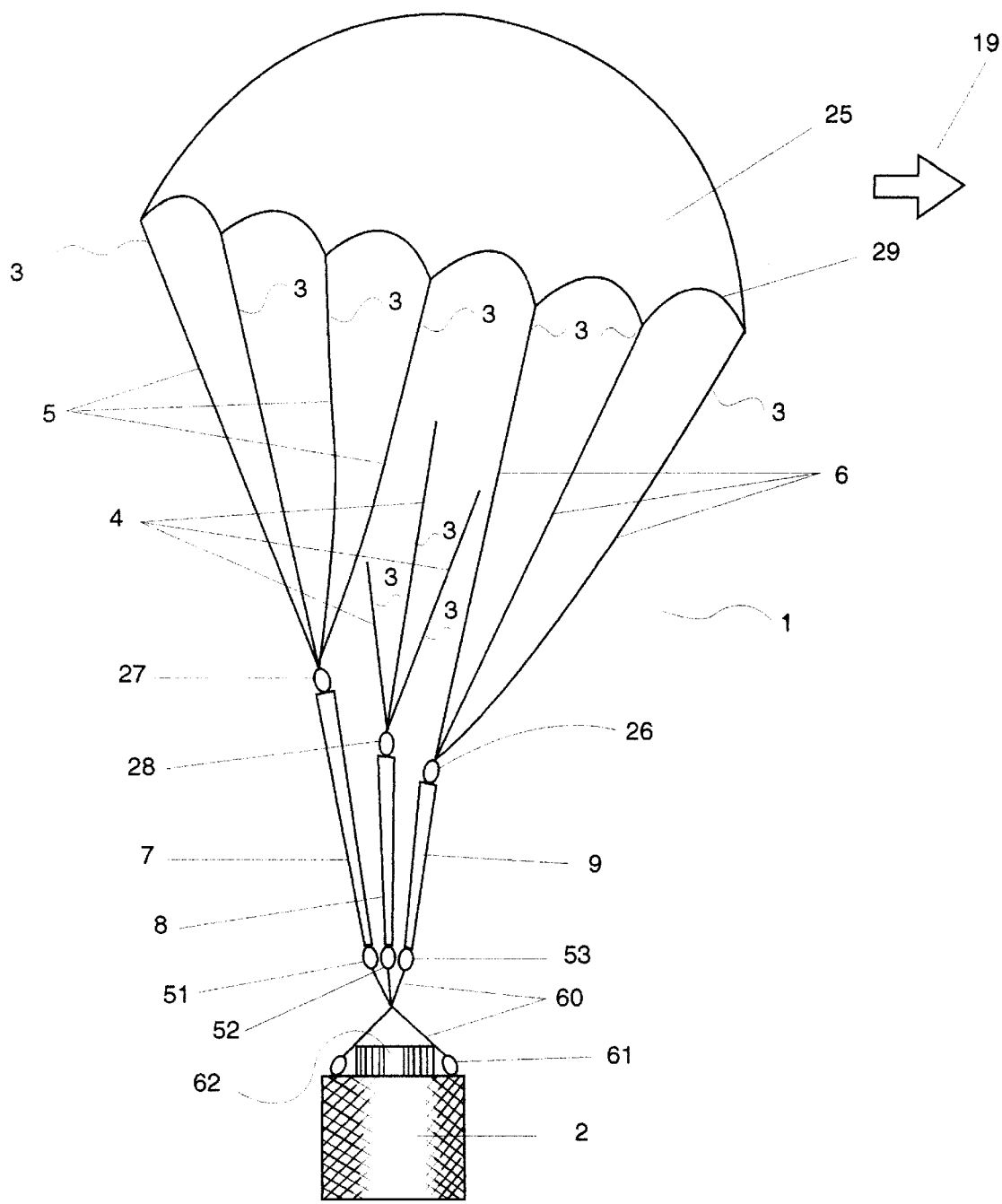
FIG. 1 shows a side view of a parachute with directional control.

FIG. 1 shows a parachute system 1 with its canopy 25 and with its load 2. The periphery of the canopy is 29. The multiple suspension lines 3 are seen to be formed into three groups 4, 5, and 6, each of which is attached to an actuator 7, 8 and 9 at 28, 27 and 26 respectively. In the view shown actuator 9 is actuated (shortened) and the canopy 25 is seen to be tilted in the direction of the actuator 9. The three actuators each attach to the payload harness 60 connectors at 51, 52 and 53. The payload harness 60 is attached to the payload 2 at three connectors 61 being one of the three. An arrow is included in the drawing to point the movement direction of the parachute motion caused by the foreshortened actuator 9. The box 62 contains navigation and guidance means.

The overall length of the actuators 7, 8, and 9 and of their stroke would be a function of the characteristics of the particular actuator being used and the detailed design goals for the degree of steering of the parachute.

Figure 2:
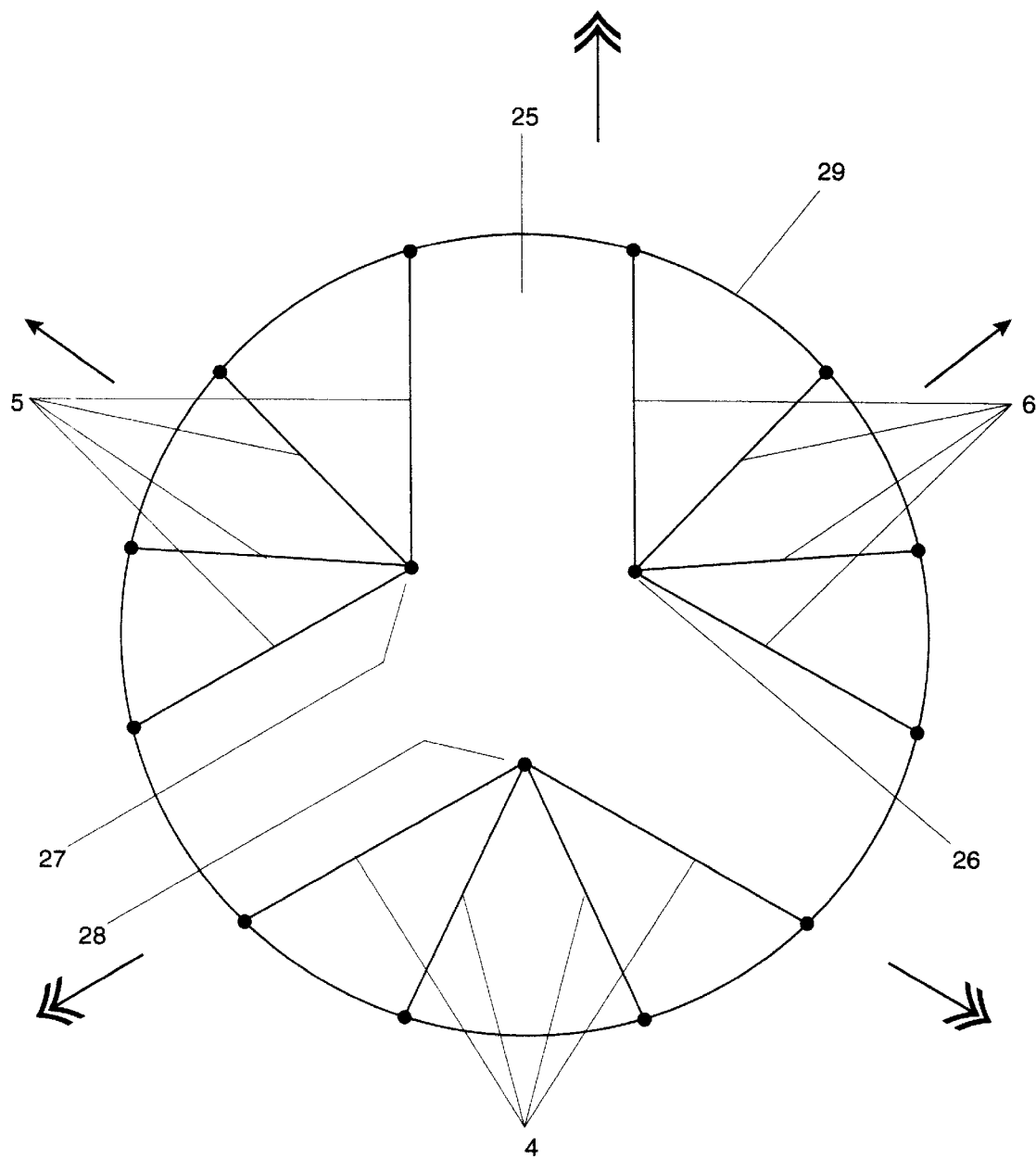
FIG. 2 shows a bottom plan view of FIG. 1 to illustrate the directions of movement caused by one or two groups of actuators within the system of suspension lines being foreshortened for the control of the descending trajectory. The load is omitted for clarity.

FIG. 2 shows a view looking up at the canopy 25 from the plane of the upper actuator attachments 26, 27 and 28. Single arrows indicate the horizontal direction of movement of the parachute which would be caused by foreshortening of any one group of suspension chords. Double arrows indicate the direction of horizontal movement of the parachute that would be caused by two of the three groups of suspension lines being foreshortened. The direction is always to the side where the foreshortening occurs.

Figure 3:
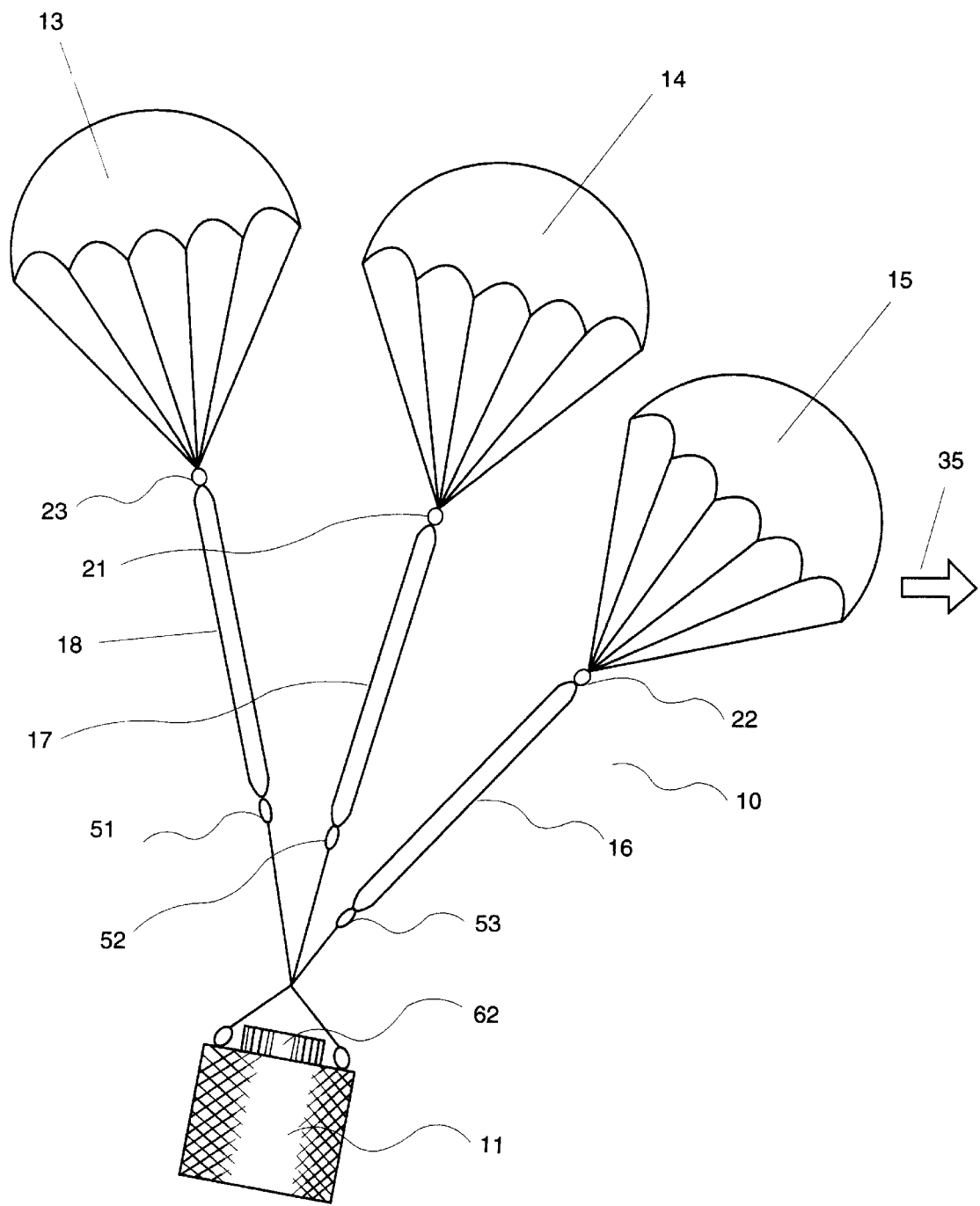
FIG. 3 shows a side view of a load suspended by multiple parachutes wherein guidance occurs by shortening of the suspension of one of the parachutes. More than one could be shortened.

FIG. 3 shows a trajectory-controlling parachute system 10 in which the load 11 is carried by a group of parachutes 13, 14 and 15. The parachutes 13, 14, and 15 are connected each to an actuator 16, 17 or 18. The action portrayed is of the load 11 moving in the direction of the arrow as caused by the foreshortening of actuator 16, the remaining actuators 17 and 18 being kept in their extended, non-actuated length.

Figure 4:
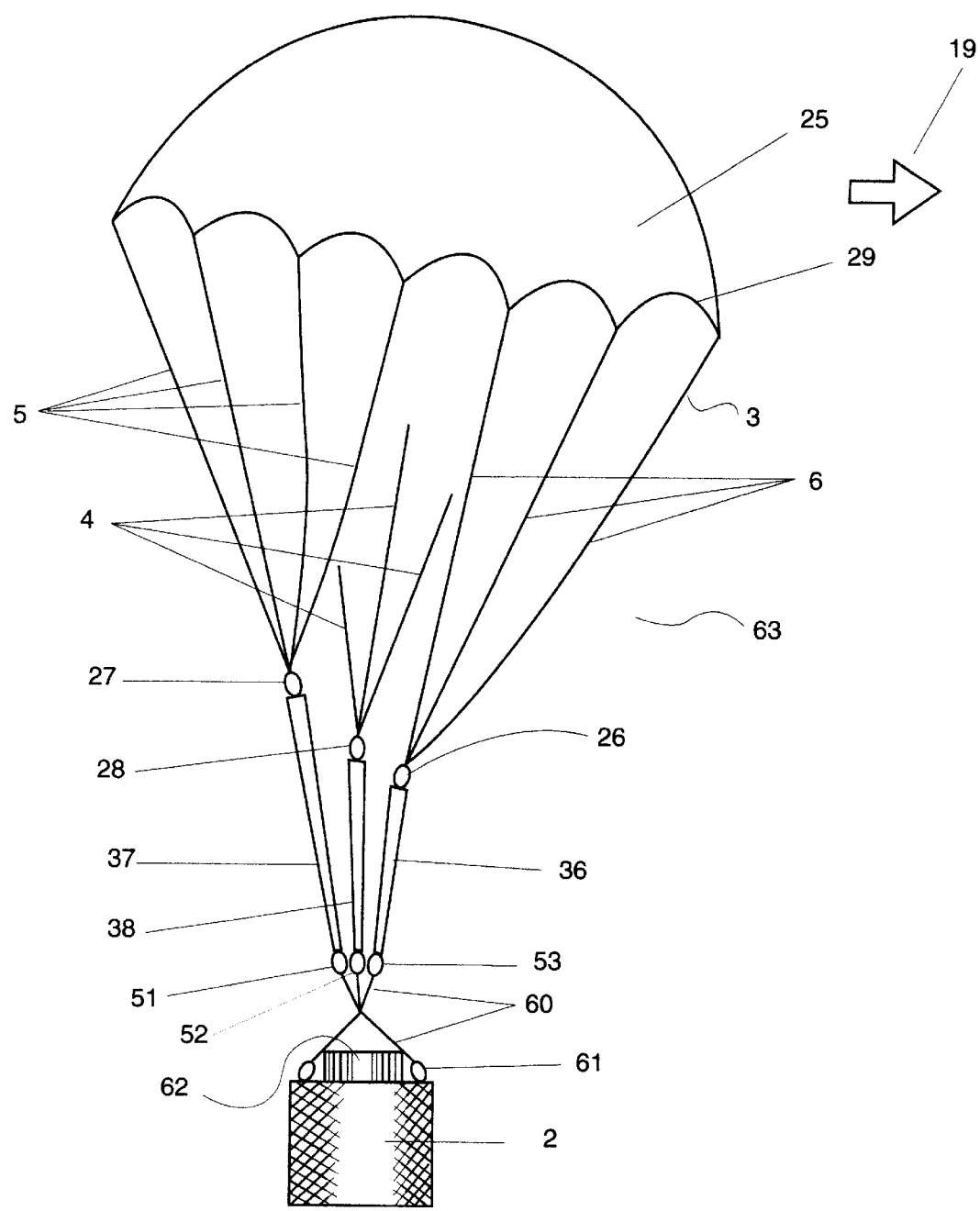
FIG. 4 appears identical to FIG. 1. However.

FIG. 4 appears identical to FIG. 1. However, FIG. 4 is presented to point out a distinctly different case than that of FIG. 1. FIG. 4 represents the case where, to begin with, all three actuators are foreshortend. The parachute system 63 then receives its directional change by a lengthening of one or more of those actuators for the suspension lines which are positioned around the canopy on the side opposite the desired direction of movement. In other words the parachute drop starts with all actuators foreshortened. Just preceding the event seen in FIG. 4, actuators 37 and 38 were lengthened while actuator 36 has remained in its original foreshortened length. As in FIG. 1, movement is to the right.

Figure 5:
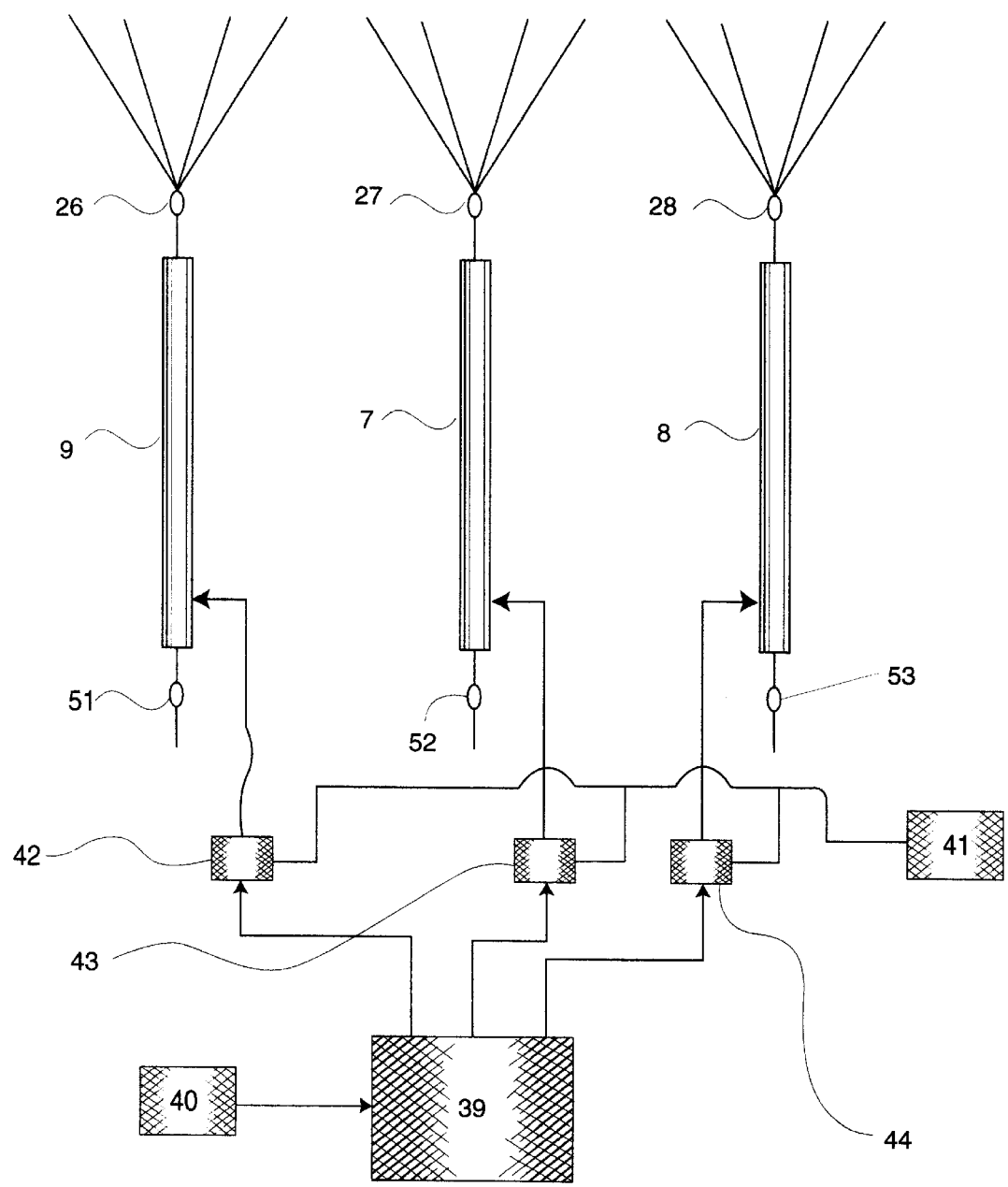
FIG. 5 is a schematic of the control and power connections.

The schematic drawing of FIG. 5 shows the control and power connections. The controls for navigation and guidance are contained in the box 39. The power supply for the computer in 39 is contained in 40. The power supply 41 drives the actuators 7, 8, and 9. The units 42, 43, and 44 can be solenoid valves if the actuators 7, 8 and 9 are pneumatic. If the actuators are electromechanical, 42, 43, and 44 would be electrical drives.

Figure 6:
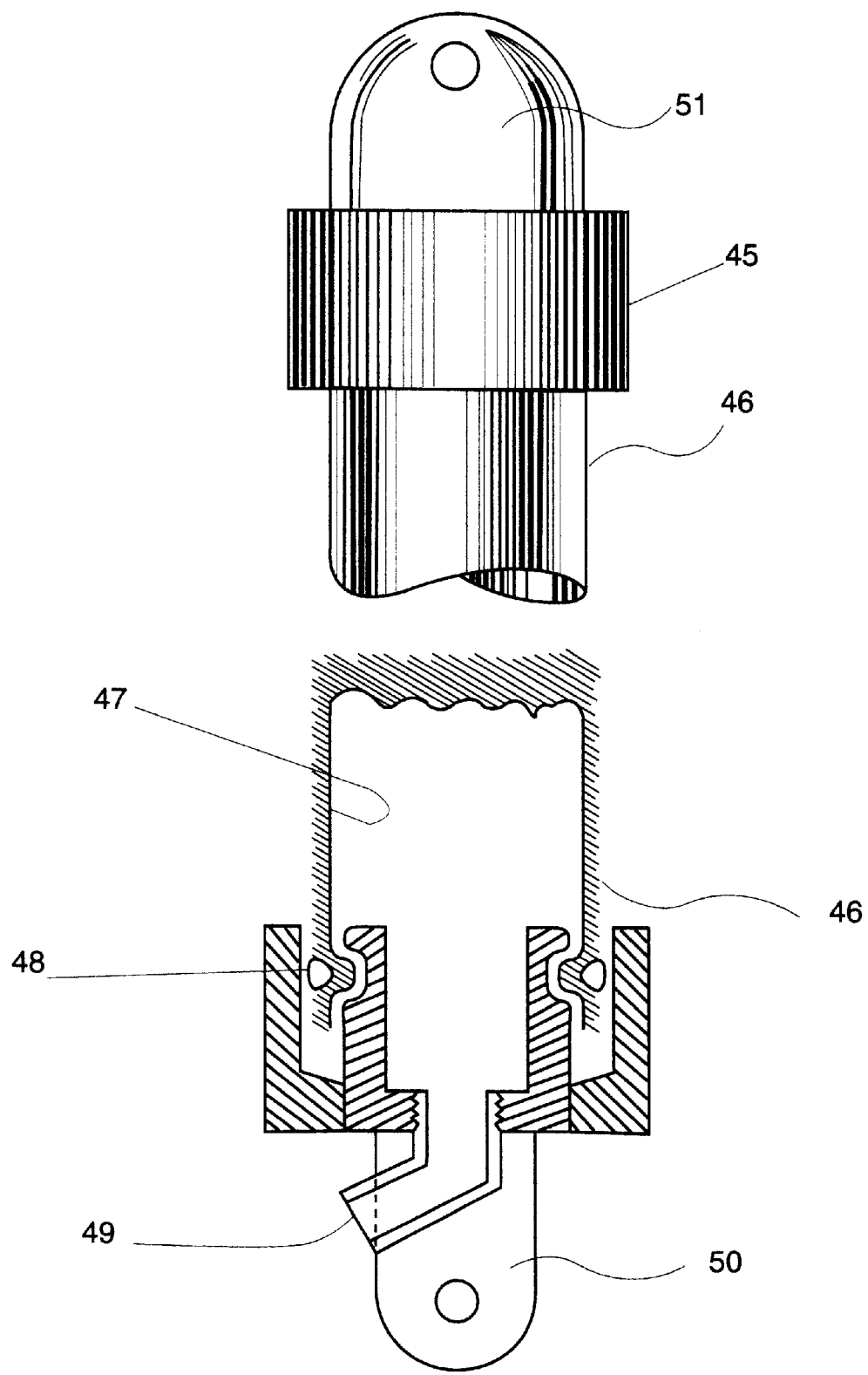
FIG. 6 shows the details of a pneumatic muscle which can be used for actuation to change a trajectory.

In FIG. 6 the elastomeric tube 47 is held within the braided tube 46 and both are held within the sealing end cap 45. Fluid flow to the unit is introduced through the tube 49. The attachment fittings at the ends are 50 and 51. The cross-sectional view details the calmping and sealing design of the end caps.

What is claimed is:

1. A trajectory-controlling system for a descending parachute, comprising:

a canopy and suspension lines leading to a payload, said suspension lines being spaced around the periphery of said canopy, said payload having a supporting harness, said periphery being divided into three or more equal arc segments, said suspension lines being divided into a number of groups equal to the number of said segments, each said group comprising all of the suspension lines with upper attachments within a particular segment of said periphery, the lower ends of said lines in each said group being fastened together at a connector;

a payload and a payload harness, said payload harness having upper and lower ends, said lower ends of said harness connecting to said payload;

multiple linear actuators, said actuators normally-long and shortened by actuation, one such actuator for each said group of suspension lines, each said actuator having an upper and a lower end, said upper and lower end of each said actuator having connection means, each said upper end being connected to one said suspension line group, each said lower end being connected to said upper ends of said payload harness;

guidance means and actuator power means, said guidance means directing said actuator power means selectively to said linear actuators;

said linear actuators shortening the distance between said upper and said lower ends when powered, said shortening pulling downward on the associated said group connector and causing one side of said canopy to be held lower than the remainder of said canopy and resulting in horizontal motion of said parachute system, said horizontal motion being used by said guidance control means to control the trajectory of said parachute system.

2. The trajectory-controlling parachute system of claim 1 in which said linear actuators are normally short, said actuators being lengthened when actuated, said lengthening allowing upward movement of the selected associated said group connector and causing one side of said canopy to be held higher than the remainder of said canopy and resulting in horizontal motion of said system of a descending parachute, said horizontal motion being used by said guidance means to control the trajectory of said parachute system.

3. The trajectory-controlling system of claim 1 in which said suspension lines are attached to said canopy as canopy-suspension lines, comprising multiple parachutes with said canopy-suspension lines and multiple payload suspension lines, said payload suspension lines comprising said payload supporting harness, actuators having upper and lower ends, said payload-suspension lines each attached to a separate actuator at its lower end; all of said canopy-attached suspension lines being divided into groups, each group comprising all of the canopy-suspension lines of one parachute, the lower end of said canopy-suspension lines of one parachute all being fastened together at a connector, said connector attached to the upper end of said actuator;

said actuator shortening the distance between said upper and said lower ends when powered, said shortening causing the associated canopies to be held lower than the remainder canopies and resulting in horizontal motion of said multiple parachute system in the direction of the resulting lower canopies.

4. The trajectory-controlling system of claim 1 in which said suspension lines are attached to said canopy as canopy-suspension lines, comprising multiple parachutes with said canopy-suspension lines and multiple payload suspension lines, said payload suspension lines comprising said payload supporting harness, actuators having upper and lower ends, said payload-suspension lines each attached to a separate actuator at its lower end; all of said canopy-attached suspension lines being divided into groups, each group comprising all of the canopy-suspension lines of one parachute, the lower end of said canopy-suspension lines of one parachute all being fastened together at a connector, said connector attached to the upper end of said actuator;

said actuator lengthening the distance between said upper and said lower ends for a given canopy when powered, said lengthening causing the associated canopies to be held higher than the remainder canopies and resulting in horizontal motion of said multiple parachute system in the direction away from the resulting higher canopies.

5. The system of claim 1, 2, 3, or 4 wherein said actuator is a pneumatic muscle device, said device comprising a braided tube of fibers, an elastomeric liner inside said tube, end caps for said device with means for mechanical attachment, means for containing a fluid under pressure, control means between said fluid under pressure and said liner.

* * * * *